US008256568B2

(12) United States Patent
Lin

(10) Patent No.: US 8,256,568 B2
(45) Date of Patent: Sep. 4, 2012

(54) PROTECTIVE SLEEVE HAVING AN EXTERNAL SOUND-AMPLIFYING MEMBER

(76) Inventor: Chin-Sheng Lin, New Taipei (TW)

(*) Notice: Subject to any disclaimer, the term of this patent is extended or adjusted under 35 U.S.C. 154(b) by 0 days.

(21) Appl. No.: 13/096,079

(22) Filed: Apr. 28, 2011

(65) Prior Publication Data

US 2012/0024619 A1  Feb. 2, 2012

(30) Foreign Application Priority Data

Jul. 28, 2010  (TW) .............................. 99214339 U

(51) Int. Cl.
*G10K 11/00* (2006.01)

(52) U.S. Cl. ......... 181/179; 181/176; 181/177; 379/454
(58) Field of Classification Search ................. 181/176, 181/177, 179; 379/454
See application file for complete search history.

(56) References Cited

U.S. PATENT DOCUMENTS

| 2,541,164 | A | * | 2/1951 | Huenlich | 181/18 |
|---|---|---|---|---|---|
| 5,392,350 | A | * | 2/1995 | Swanson | 379/446 |
| 5,661,798 | A | * | 8/1997 | Chen | 379/454 |
| 5,703,946 | A | * | 12/1997 | Chen | 379/454 |
| 5,937,332 | A | * | 8/1999 | Karabinis | 455/12.1 |
| 6,526,142 | B1 | * | 2/2003 | Fan | 379/420.04 |
| 7,403,613 | B2 | * | 7/2008 | Liou | 379/455 |
| 8,028,794 | B1 | * | 10/2011 | Freeman | 181/202 |
| 2002/0009195 | A1 | * | 1/2002 | Schon | 379/454 |
| 2010/0059649 | A1 | * | 3/2010 | Buxton | 248/371 |
| 2010/0219012 | A1 | * | 9/2010 | Baumbach | 181/177 |

FOREIGN PATENT DOCUMENTS

| CN | 2626224 Y | 4/2005 |
|---|---|---|
| CN | 2696224 Y | 4/2005 |
| CN | 200969613 Y | 10/2007 |
| EP | 0116421 B1 | 1/1989 |
| GB | 319 399 A | 9/1929 |
| GB | 2377116 A | 12/2002 |
| WO | 0024178 A1 | 4/2000 |
| WO | 2007111650 A1 | 4/2007 |
| WO | 2011066682 A1 | 9/2011 |

OTHER PUBLICATIONS

UK Search Report.
Hungary Search Report.
Singapore Search Report issued on Jan. 11, 2012.
Germany Search Report issued on Mar. 16, 2012.

* cited by examiner

*Primary Examiner* — Forrest M Phillips
(74) *Attorney, Agent, or Firm* — Chun-Ming Shih; HDLS IPR Services

(57) ABSTRACT

A protective sleeve having an external sound-amplifying member is configured to cover a portable electronic product having an audio port, and it includes a covering element covering the portable electronic product and a sound-amplifying member. A surface of the covering element is provided with a connecting hole in communication with the audio port. The sound-amplifying member is hollow and connected to the outside of the covering element. One end of the sound-amplifying member is formed into an insertion section inserted into the connecting hole, and the other end thereof is formed into a sound-amplifying section. The sound of the portable electronic product is emitted from the audio port and amplified through the sound-amplifying member and the sound-amplifying section. By this structure, an external loud speaker is unnecessary, and the protective sleeve itself can generate a sufficient sound-amplifying effect, thereby increasing the functionality and practicability of the protective sleeve.

8 Claims, 8 Drawing Sheets

PROTECTIVE SLEEVE HAVING AN EXTERNAL SOUND-AMPLIFYING MEMBER

BACKGROUND OF THE INVENTION

1. Field of the Invention

The present invention relates to a protective sleeve of a portable electronic product, and in particular to a protective sleeve having an external sound-amplifying member.

2. Description of Prior Art

With the advancement of science and technology, many kinds of portable electronic products are proposed and widely used in our daily life, such as mobile phones, digital cameras, MP3 players or the like. In order to protect these portable electronic products from suffering scraps or wears, various protective sleeves are designed accordingly. Such protective sleeves are made of plastic, rubber, silicon, synthetic leather or natural leather to cover outer surfaces of the portable electronic product for protection.

When a user intends to listen to the music emitted from an audio port of the portable electronic device, the user has to insert an earphone plug into the audio port and then wears the earphone to thereby hear the music. Alternatively, the user utilizes a loud speaker built in the portable electronic product to play the music via the audio port. However, the sound-amplifying effect of this built-in loud speaker of the portable electronic device is insufficient. Thus, most people like to use an external loud speaker to generate a better loud-amplifying effect, which consumes more electricity and makes the user feel inconvenient to carry such an external loud speaker.

Although the above conventional protective sleeve protects the outer surfaces of the portable electronic product, it does not have a sound-amplifying effect. If the protective sleeve itself has a sound-amplifying effect, the user needs not to carry an external loud speaker additionally. The protective sleeve itself generates a good sound-amplifying effect, which is convenient and practical. Thus, it is an important issue for the present inventor to solve the above-mentioned problems.

SUMMARY OF THE INVENTION

The present invention is to provide a protective sleeve having an external sound-amplifying member, which is provided with an external sound-amplifying member to generate a sufficient sound-amplifying effect.

The present invention is to provide a protective sleeve having an external sound-amplifying member, which is configured to cover a portable electronic product having an audio port, the protective sleeve including:

a covering element configured to cover the portable electronic product, a surface of the covering element being provided with a connecting hole in communication with the audio port; and a sound-amplifying member having a hollow interior and connected to the outside of the covering element, one end of the sound-amplifying member being formed into an insertion section inserted into the connecting hole, and the other end thereof being formed into a sound-amplifying section, wherein a sound of the portable electronic product is emitted from the audio port and amplified through the sound-amplifying member and the sound-amplifying section.

In comparison with prior art, the present invention has the following advantageous features.

Since the protective sleeve of the present invention is provided with an external sound-amplifying member, the sound of the portable electronic product is emitted from the audio port and amplified through the sound-amplifying member and the sound-amplifying section. Thus, an external loud speaker is unnecessary, and the protective sleeve itself can generate a sufficient sound-amplifying effect. Therefore, the functionality and practicability of the protective sleeve of the present invention is increased greatly.

DETAILED DESCRIPTION OF THE INVENTION

Figure 1:
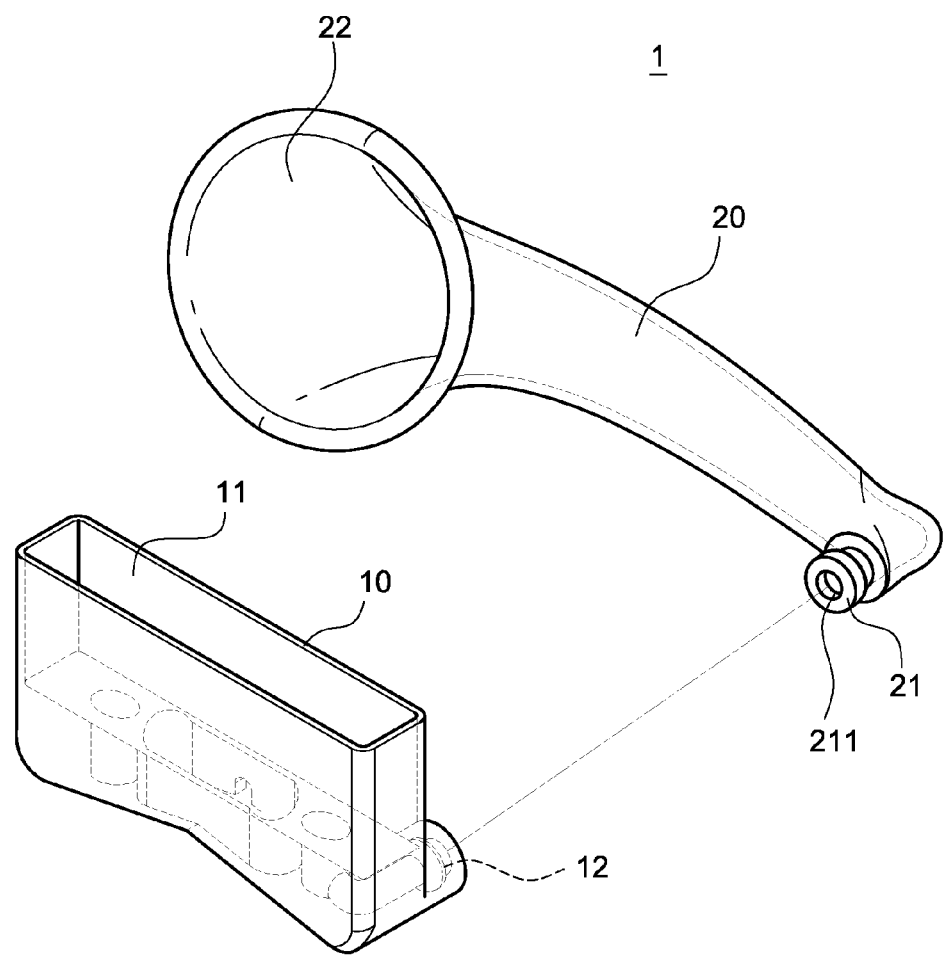
FIG. 1 is an exploded perspective view showing a first embodiment of the present invention.
Figure 2:
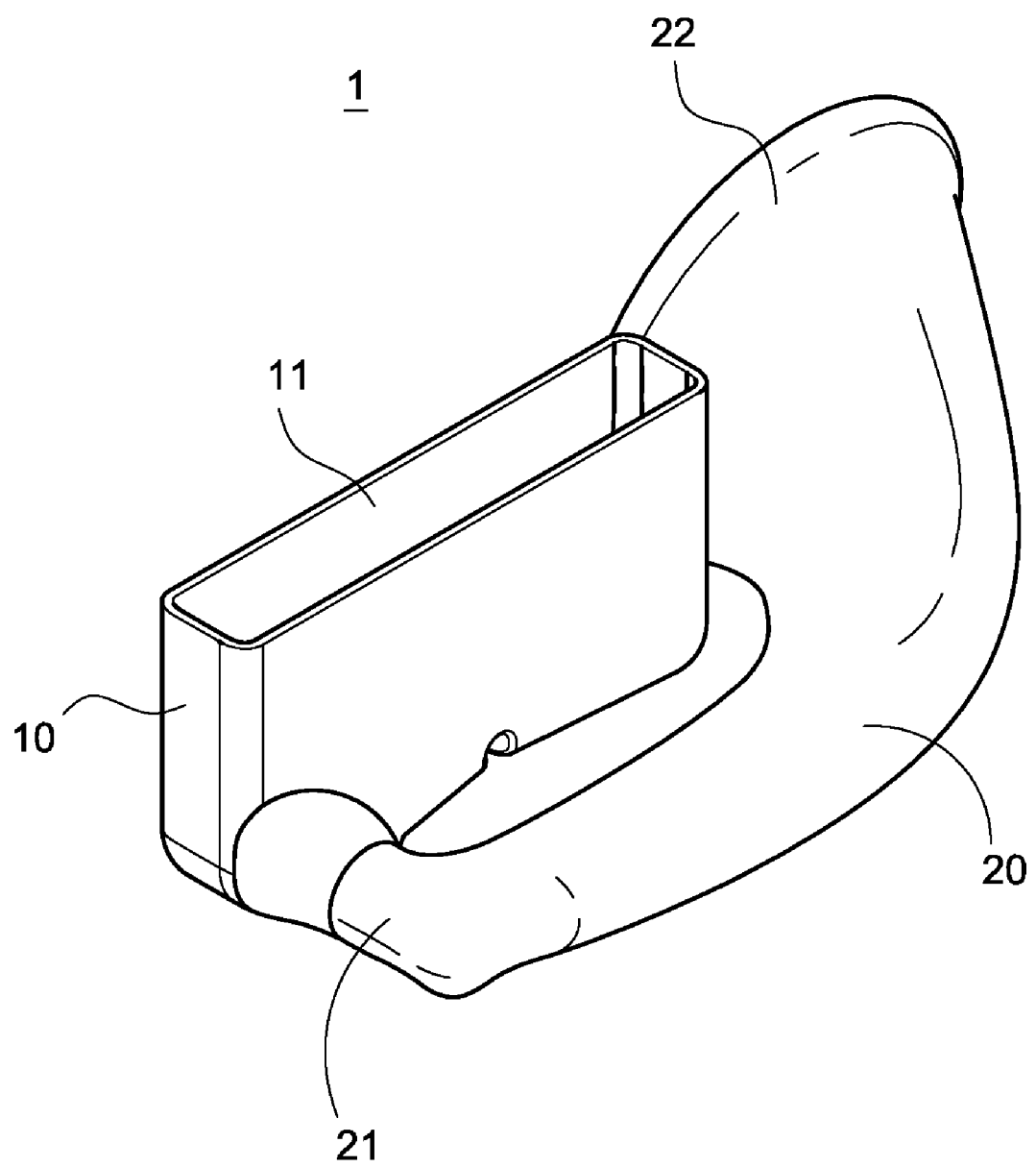
FIG. 2 is an assembled perspective view showing the first embodiment of the present invention.

The detailed description and technical contents of the present invention will become apparent with the following detailed description accompanied with related drawings. It is noteworthy to point out that the drawings is provided for the illustration purpose only, but not intended for limiting the scope of the present invention.

Please refer to FIGS. 1 to 4, which show a first embodiment of the present invention. The present invention provides a protective sleeve 1 having an external sound-amplifying member, which is configured to cover a portable electronic product 100 having an audio port 110. In the present embodiment, the audio port 110 is located in the bottom of the portable electronic product 100. Of course, the audio port 110 may be provided in the portable electronic product 100 at other locations based on practical demands.

The protective sleeve 1 includes a covering element 10 and a sound-amplifying member 20. In the present embodiment, the portable electronic product 100 is formed into a rectangular shape, which is the most common shape. Thus, the covering element 10 has a corresponding rectangular shape. Of course, the covering element 10 may have other profile as long as it corresponds to the profile of the portable electronic product 100. The protective sleeve 1 (including the covering element 10 and the sound-amplifying member 20) may be made of plastic rubber, silicon or other materials having suitable flexibility and stretchability.

Figure 3:
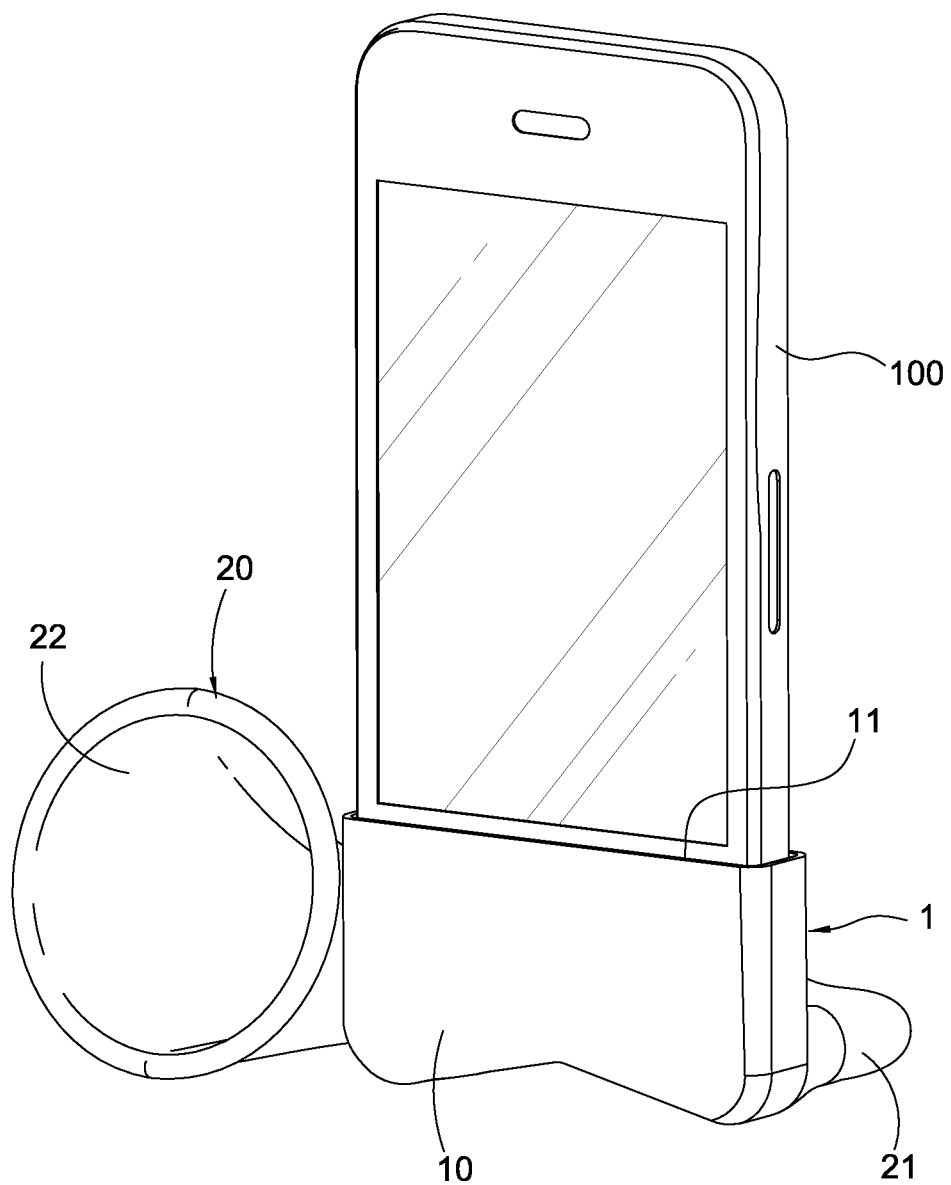
FIG. 3 is an assembled perspective view showing the first embodiment of the present invention and a portable electronic product.
Figure 4:
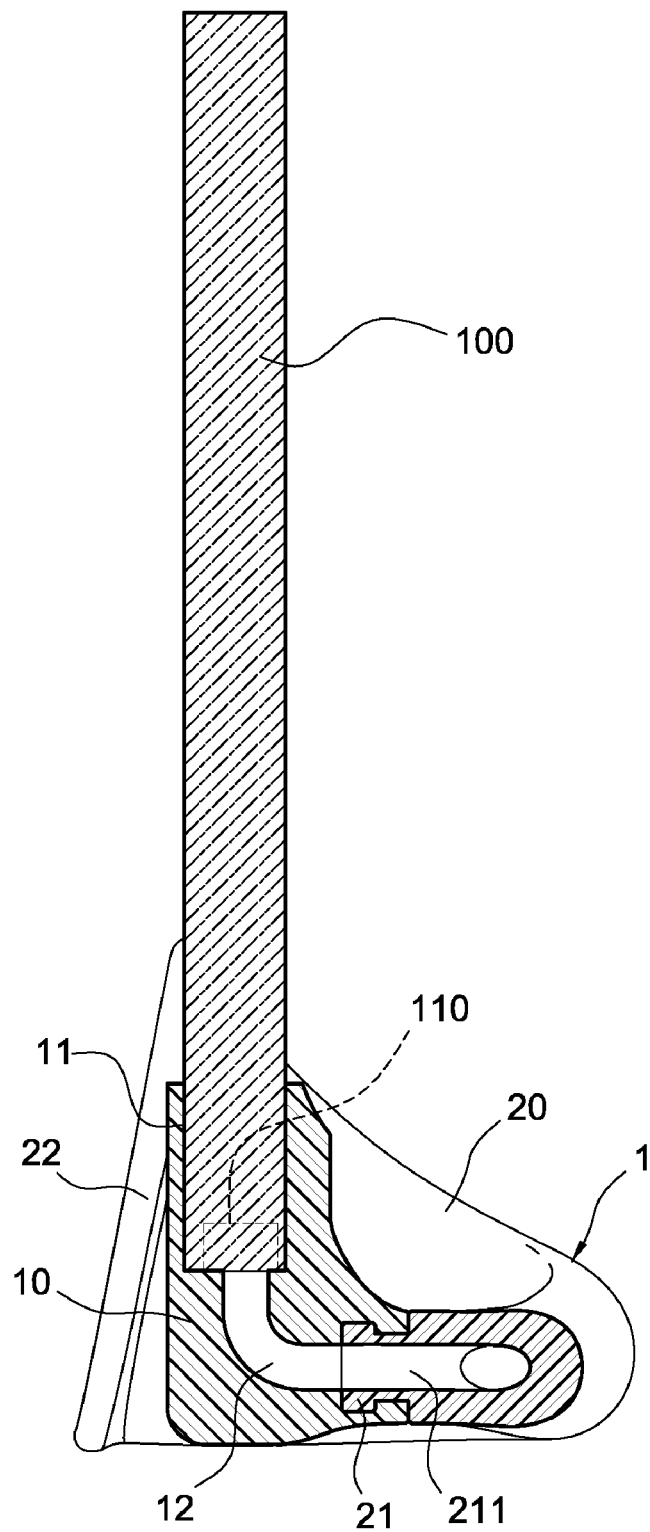
FIG. 4 is a side cross-sectional view of FIG. 3.

In the first embodiment of the present invention, the covering element 10 merely covers a lower portion of the portable electronic product 100 as shown in FIG. 3. The covering element 10 is assembled with the sound-amplifying member 20 outside the covering element 10, whereby the portable electronic product 100 disposed in the protective sleeve 1 can be erected. The covering element 10 is provided with an accommodating trough 11 for allowing the portable electronic product 100 to be accommodated therein. More specifically, the accommodating trough 11 is provided on the top of the covering element 10, so that the user can put the portable electronic product 100 into the accommodating trough 11 of the covering element 10 easily. It should be noted that, a surface of the covering element 10 is provided with a connecting hole 12 in communication with the audio port 110. In the embodiment shown in FIG. 1, the connecting hole 12 is provided on the rear surface of the covering element 10 in communication with the audio port 110, as shown in FIG. 4.

Further, the lower portion of the covering element 10 may be provided with different through-holes (indicated by dotted lines) based on the locations of the connecting ports of various portable electronic products 100, such as a power line, a USB transmission line and other plugs.

The sound-amplifying member 20 is hollow and connected to the outside of the covering element 10. One end of the sound-amplifying member 10 is formed into an insertion section 21 inserted into the connecting hole 12, and the other end thereof is formed into a sound-amplifying section 22. The insertion section 21 is provided with a through-hole 211 in communication with the audio port 110. Further, it can be seen from FIG. 2 that, two bending portions are provided between the insertion section 21 and the sound-amplifying section 22 to form a zigzag shape, which is to increase the length of the sound-amplifying member 20. By this sufficiently long sound-amplifying member 20, the difference between the diameters of the insertion section 21 and the sound-amplifying section 22 can be increased gradually. It can be seen from FIG. 2 that, the sound-amplifying section 22 is shaped as a horn which is bent from the rear surface to the side surface of the covering element 10. The covering element 10 is assembled with the sound-amplifying member 20 to allow the protective sleeve 1 to be erected stably, so that the portable electronic product 100 received in the protective sleeve 1 can be also erected accordingly. The sound of the portable electronic product 100 is emitted from the audio port 110 and amplified through the sound-amplifying member 20 and the sound-amplifying section 22, so that the protective sleeve 1 can generate a sufficient sound-amplifying effect.

It should be noted that, in the first embodiment, the insertion section 21 of the sound-amplifying member 20 is inserted into the connecting hole 12 of the covering element 10. Thus, the sound-amplifying member 20 can rotate relative to the covering element 10 by using the connecting hole 12 as a center of rotation, so that the sound-amplifying member 20 can be disposed on the left side or right side of the covering element 10.

Figure 5:
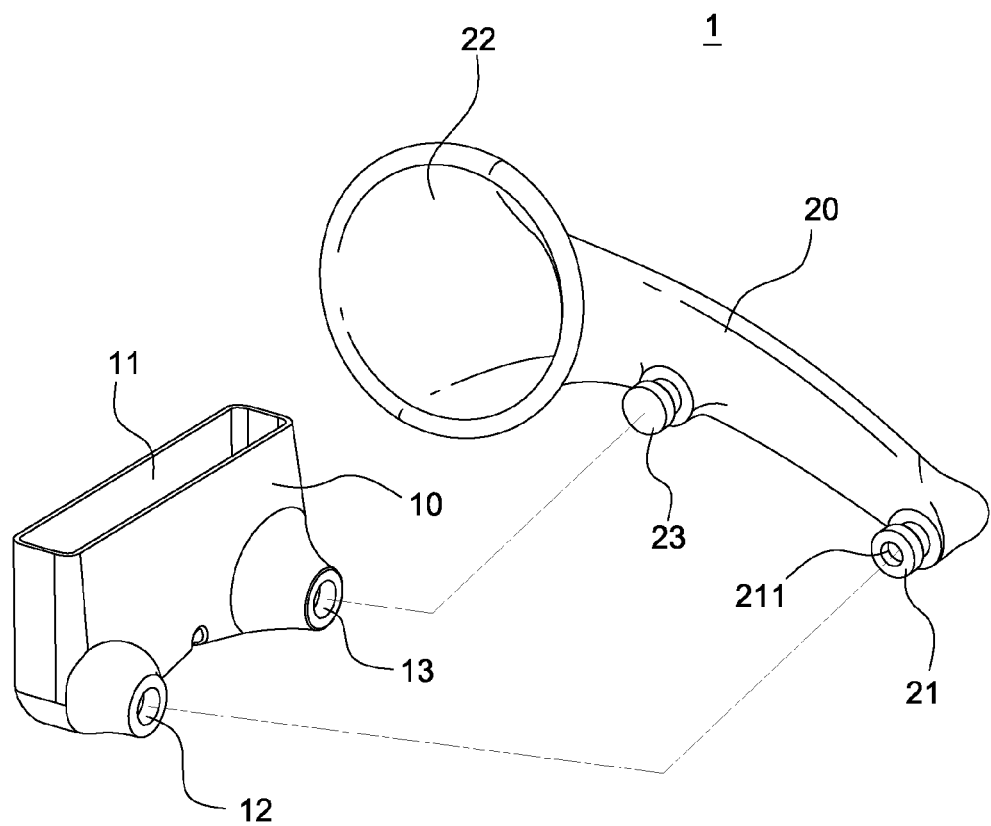
FIG. 5 is an exploded perspective view showing a second embodiment of the present invention.

Please refer to FIG. 5, which shows the second embodiment of the present invention. The difference between the second embodiment and the first embodiment lies in that: the rear surface of the covering element 10 in the second embodiment is further formed with a restricting hole 13 near the connecting hole 12. The sound-amplifying member 20 is formed with a positioning post 23 engaged with restricting hole 13. In this way, the sound-amplifying member 20 can be fixed to one side of the covering element 10 without pivotally rotating relative to the covering element 10.

Figure 6:
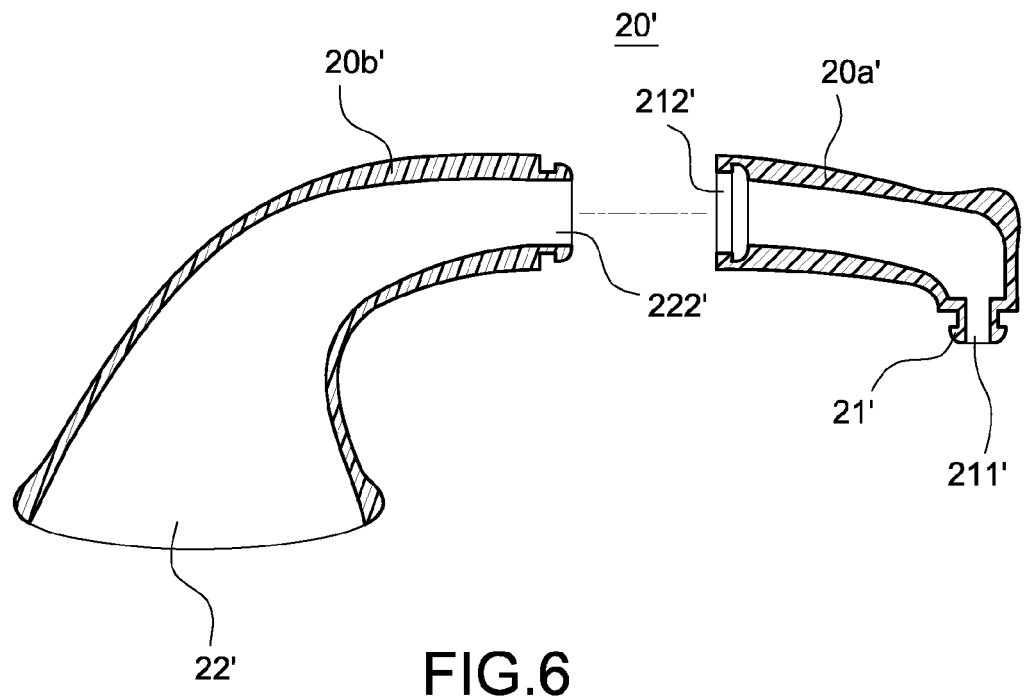
FIG. 6 is a cross-sectional perspective view showing the sound-amplifying member according to another embodiment of the present invention.
Figure 7:
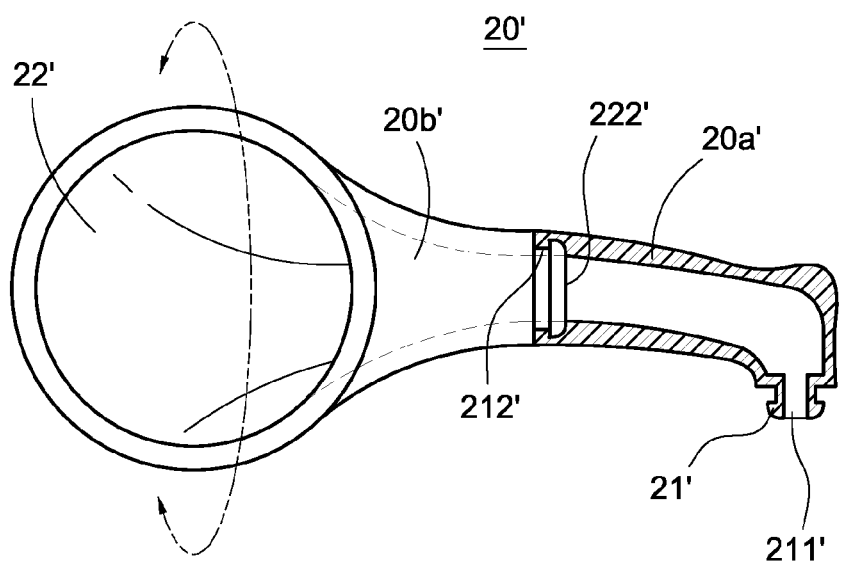
FIG. 7 is an assembled cross-sectional view showing the sound-amplifying member according to another embodiment of the present invention.

Please refer to FIGS. 6 and 7, which show the sound-amplifying member according to another embodiment of the present invention. In FIGS. 1 to 5, the sound-amplifying member 20 is an integral member. However, in FIGS. 6 and 7, the sound-amplifying member 20' is a two-piece member constituted of a front part 20a' and a rear part 20b' assembled with the front part 20a'. The front part 20a' is hollow and formed with an insertion section 21'. The insertion section 21' is provided with a through-hole 211' in communication with the audio port 110. The other end of the front part 20a' away from the insertion section 21' is formed with an assembling hole 212'. The rear part 20b' is hollow and formed with a sound-amplifying section 22'. One end of the rear part 20b' away from the sound-amplifying section 22' is formed into an assembling head 222' assembled with the assembling hole 212'. Since the assembling head 222' of the rear part 20b' is inserted into the assembling hole 212' of the front part 20a', the rear part 20b' can rotate relative to the front part 20a'. In this way, as shown in FIG. 7, the horn-like opening of the sound-amplifying section 22' can be adjusted to a suitable orientation in which the user listens to the sound more clearly.

Figure 8:
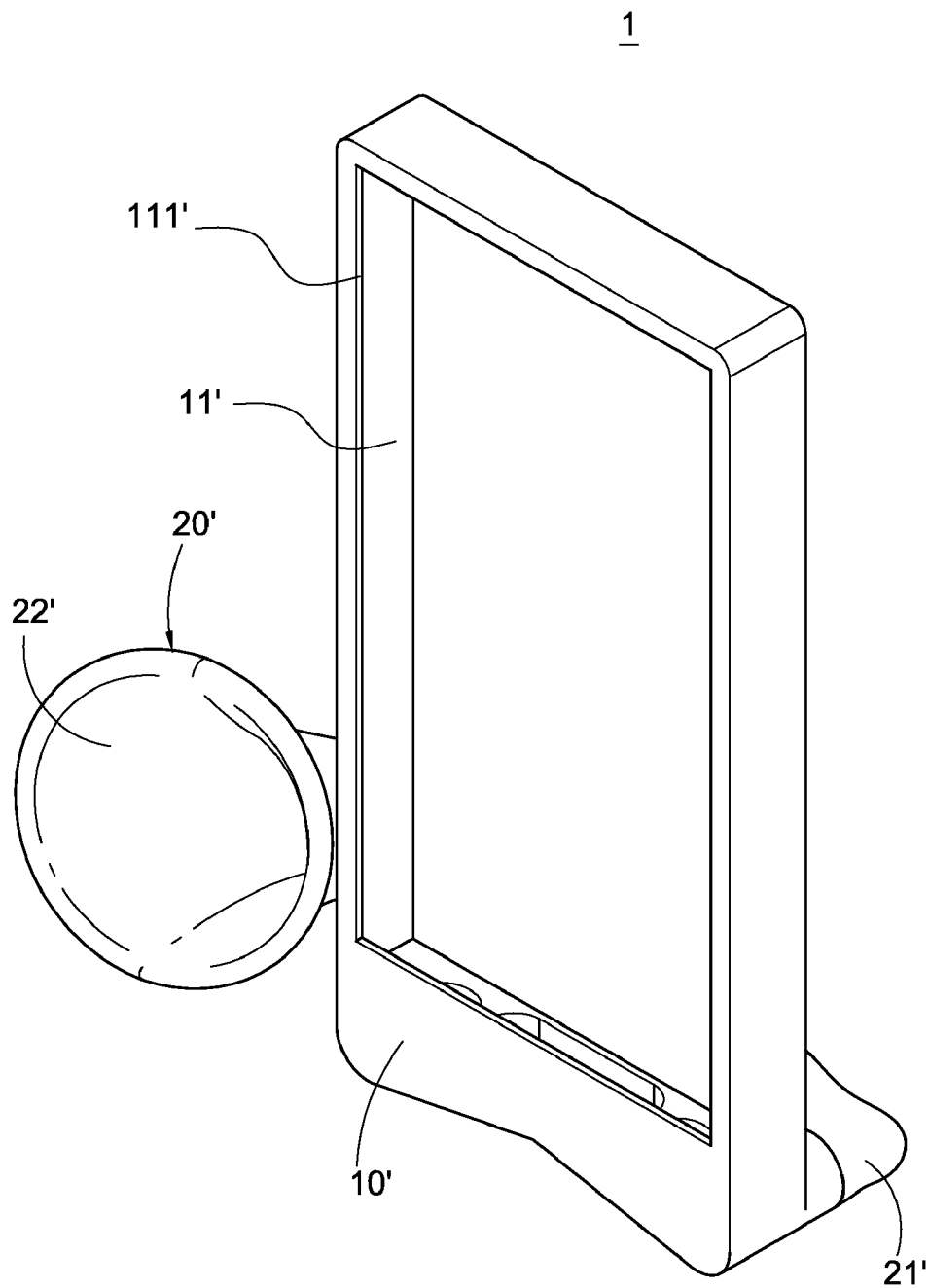
FIG. 8 is an assembled perspective view of a third embodiment of the present invention.

Please refer to FIG. 8, which shows the third embodiment of the present invention. The difference between the third embodiment and the first embodiment lies in that: the covering element 10 of the first embodiment merely covers the lower portion of the portable electronic product 100, whereas the covering element 10' of the second embodiment covers the outer surfaces of the portable electronic product 100 completely. It can be seen from FIG. 8 that, the accommodating trough 11' is provided within the covering element 10', and the front surface of the covering element 10' is provided with an accommodating opening 111'. The user can dispose the upper edge of the portable electronic product 100 into the upper edge of the accommodating opening 111'. Then, by means of the flexibility and stretchability of the covering element 10', the user stretches the lower edge of the accommodating opening 111' to dispose the portable electronic product 100 into the covering element 10' (not shown), so that the covering element 10' can cover the outer surfaces of the portable electronic product 100 completely. In the third embodiment, the sound-amplifying member 20' can be configured as any one of the above two forms of the sound-amplifying members, so that the description thereof is omitted for simplicity.

Figure 9:
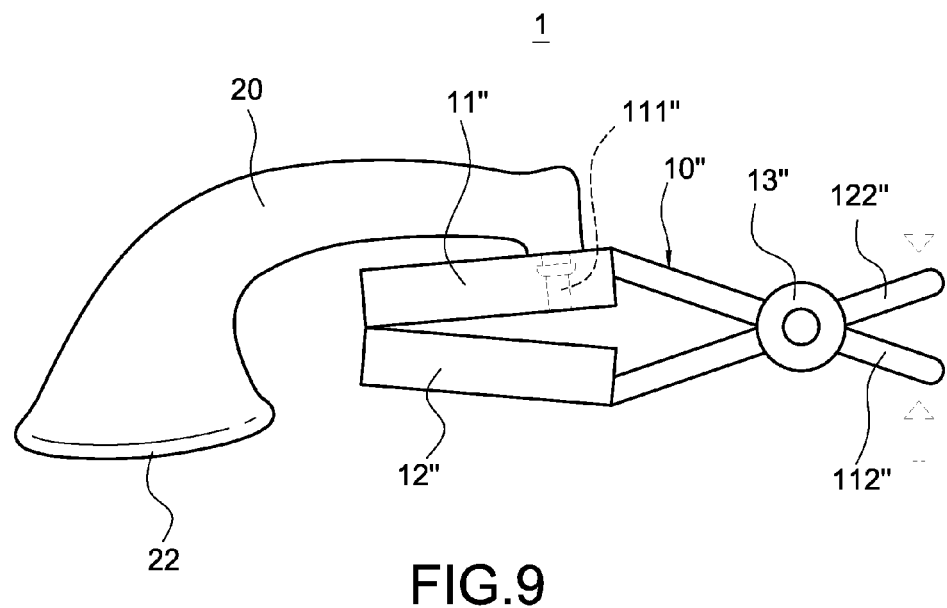
FIG. 9 is an assembled perspective view of a fourth embodiment of the present invention.
Figure 10:
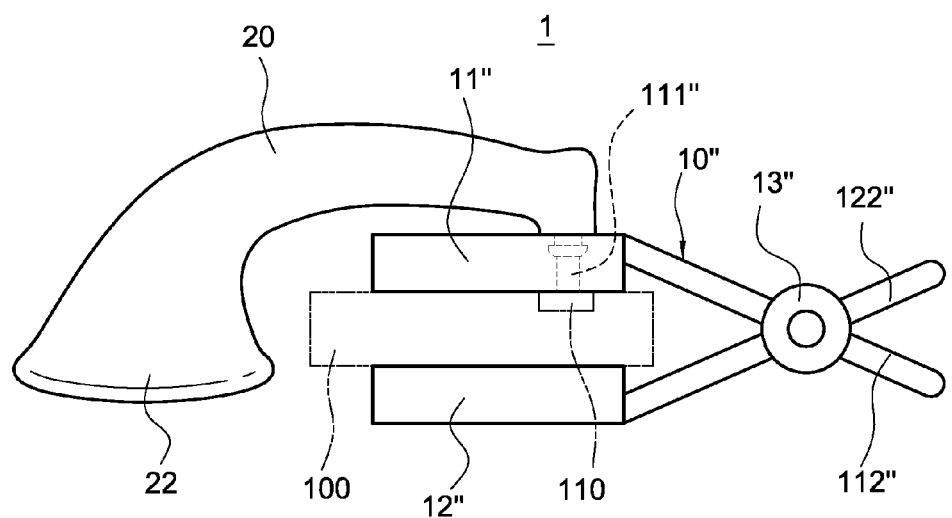
FIG. 10 is an assembled perspective view showing the fourth embodiment of the present invention and a portable electronic product.

Please refer to FIGS. 9 and 10, which show the fourth embodiment of the present invention. The difference between the fourth embodiment and the first embodiment lies in that: the covering element 10 of the first embodiment is an integral member, whereas the covering element 10" of the fourth embodiment comprises a first part 11", a second part 12" and a pivoting piece 13" pivotally connected to the first part 11" and the second part 12". The first part 11" is provided with a connecting hole 111" to correspond to the audio port 110 of the portable electronic product 100 (FIG. 10). One end of the first part 11" protrudes to form a first extension rod 112", and one end of the second part 12" protrudes to form a second extension rod 122". The first extension rod 112" and the second extension rod 122" are pivotally connected within the pivoting piece 13" and penetrate the pivoting piece 13". When the user presses the two portions of the first extension rod 112" and the second extension rod 122" penetrating the pivoting piece 13", the first part 11" and the second part 12" cooperate with each other to clamp the front and rear surfaces of the portable electronic product 100, thereby protecting the portable electronic product 100.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A protective sleeve configured to cover a portable electronic product having an audio port, the protective sleeve including:
   a covering element configured to cover the portable electronic product, a surface of the covering element being provided at two sides with a connecting hole in communication with the audio port and a restricting hole; and
   a sound-amplifying member having a hollow interior and a positioning post inserted into the restricting hole, and connected to the outside of the covering element, one end of the sound-amplifying member being formed into an insertion section inserted into the connecting hole, and the other end thereof being formed into a sound-amplifying section,
   wherein a sound of the portable electronic product is emitted from the audio port and amplified through the sound-amplifying member and the sound-amplifying section.

2. The protective sleeve according to claim 1, wherein the insertion section is provided with a through-hole in communication with the connecting hole.

3. The protective sleeve according to claim 2, wherein the covering element covers a portion of the portable electronic product, and the covering element is provided with an accommodating trough for allowing the portable electronic product to be accommodated therein so that the portable electronic product is erected by supporting of the sound-amplifying member together with the covering element.

4. The protective sleeve according to claim 2, wherein at least one bending portion is provided between the insertion section and the sound-amplifying section to form a zigzag shape, the diameter of the sound-amplifying section is larger than that of the insertion section.

5. The protective sleeve having an external sound-amplifying member according to claim 2, wherein the sound-amplifying member is constituted of a front part and a rear part assembled with the front part, the front part is hollow and formed with the insertion section, one end of the front part away from the insertion section is formed with an assembling hole, the rear part is hollow and formed with the sound-amplifying section, one end of the rear portion away from the sound-amplifying section is formed with an assembling head assembled with the assembling hole.

6. The protective sleeve having an external sound-amplifying member according to claim 2, wherein the covering element covers outer surfaces of the portable electronic product completely.

7. The protective sleeve having an external sound-amplifying member according to claim 2, wherein the covering element comprises a first part, a second part, and a pivoting piece pivotally connected to the first part and the second part, the first part and the second part cooperate with each other to clamp the portable electronic product.

8. The protective sleeve having an external sound-amplifying member according to claim 7, wherein the first part is provided with a connecting hole corresponding to the audio port, one end of the first part protrudes to form a first extension rod, one end of the second part protrudes to form a second extension rod, the first extension rod and the second extension rod are pivotally connected to the pivoting piece.

* * * * *